UNITED STATES PATENT OFFICE.

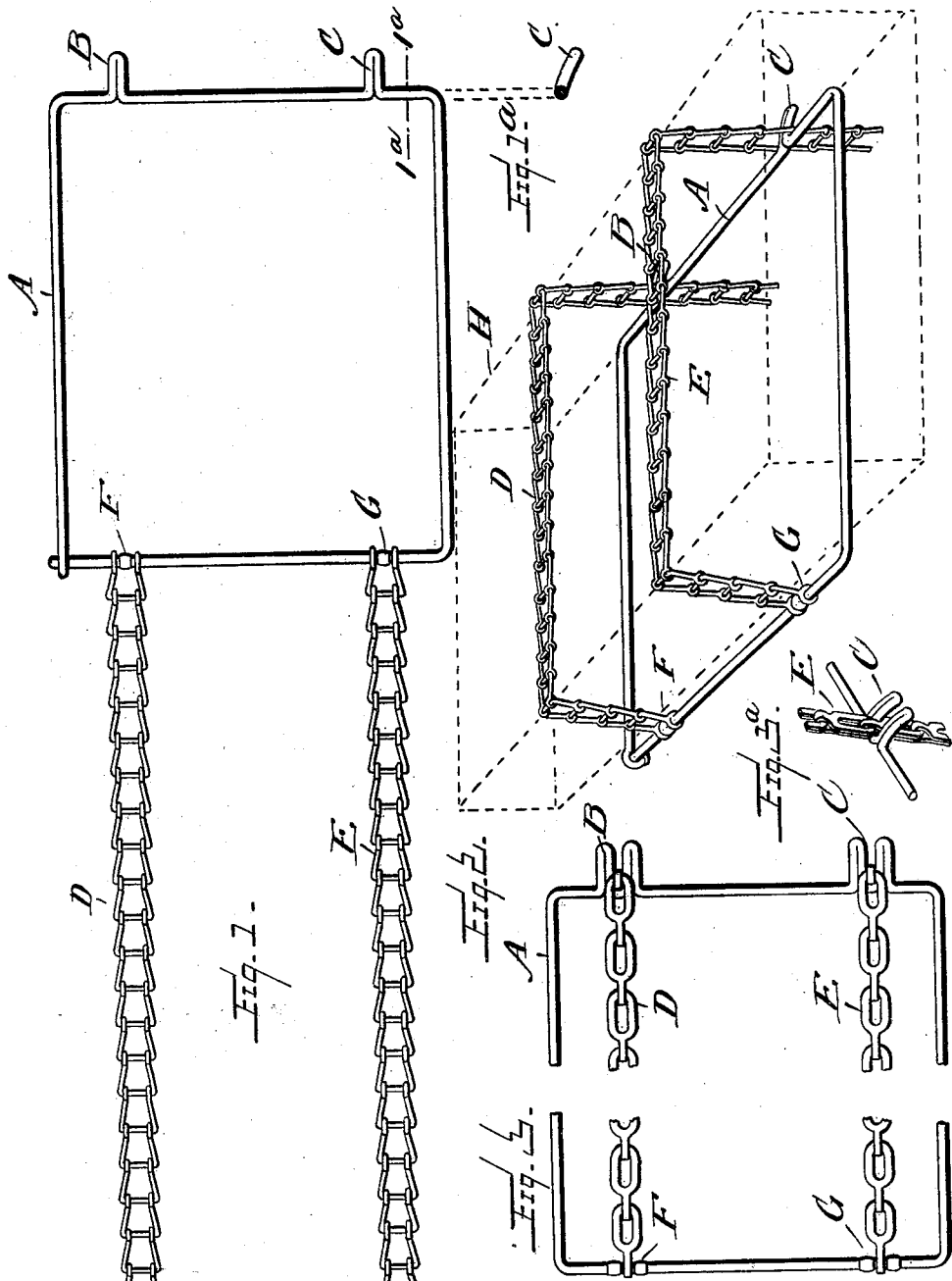

HENRY HEINTZ, OF ELKTON, SOUTH DAKOTA.

LETTER-HOLDER.

No. 890,511.  Specification of Letters Patent.  Patented June 9, 1908.

Application filed July 24, 1907. Serial No. 385,327.

*To all whom it may concern:*

Be it known that I, HENRY HEINTZ, a citizen of the United States, and residing at Elkton, in Brookings county, and State of South Dakota, have invented a new and useful Letter-Holder; of which the following is a specification.

My invention is an improvement in devices for tying or binding together bundles of letters or parcels of any kind and has for an object to provide a simple construction which may be readily utilized for securing bundles or letters or other parcels varying in size; and the invention consists in certain novel constructions and combinations of parts, as will be hereinafter described and claimed.

In the drawing Figure 1 is a plan view of the device opened out. Fig. 1ª is a detail cross-section on about line 1ª, 1ª of Fig. 1. Fig. 2 is a perspective view of the device as in use, the package being indicated in dotted lines. Fig. 3 is a plan view of the device showing a somewhat different construction from that presented in Figs. 1 and 2, and Fig. 3ª is a detail perspective view, illustrating one of the hooks shown in Fig. 3.

In carrying out my invention I employ a frame A, which may be square or oblong and is provided on one of its cross-bars with hooks B and C, which may be in the form of single hooks, as shown in Fig. 1, or double hooks, as shown in Fig. 3, and the opposite cross-bar is provided with bosses F and G which may lie between the side bars of the chain links, as shown in Figs. 1 and 2, or on opposite sides of the link bar, as shown in Fig. 3, the purpose of these bosses being to hold the links from movement along the side bar and preserve the chains in position for use.

At H, I indicate in dotted lines a bundle to be held by chains D and E, the latter in use being passed over the bundle or parcel and hooked in engagement with the hooks or projections, any suitable link being engaged with the hooks or projections in order to tightly secure bundles of different sizes.

It will be noticed the construction is simple, durable, can be easily applied for use, readily fastened, and unfastened, will not injure the letters or other material which may be secured in the holder, and will be found generally efficient for the purpose for which it is designed.

I claim:

An apparatus comprising a frame having opposite cross bars, one of which is provided with hooks and the other with bosses and links secured at one end to the latter cross bar and held by the bosses thereof from movement along the side bar and arranged to engage with the hooks or projections on the other cross bar, substantially as set forth.

In testimony whereof I have hereunto signed my name to this specification in the presence of two witnesses.

HENRY HEINTZ.

Witnesses:
 FRED W. CUCKOW,
 WM. J. LEIGH.